: 3,231,618
Patented Jan. 25, 1966

3,231,618
PRODUCTION OF TERTIARY AMINES FROM TRIALKYL ALUMINUMS
Nathaniel B. Tucker and Paul W. Iliand, Cincinnati, Ohio, assignors to The Procter & Gamble Company, Cincinnati, Ohio, a corporation of Ohio
No Drawing. Filed July 23, 1962, Ser. No. 211,862
14 Claims. (Cl. 260—583)

This invention relates to the production of tertiary amines and has for its general object the provision of a process for the production of tertiary amines from trialkyl aluminum. More particularly, the invention provides a process whereby tertiary amines having one fatty alkyl group and two lower alkyl groups are produced from trialkyl aluminum having fatty alkyl groups. Specifically the invention provides a process whereby trialkyl aluminum having fatty alkyl groups is reacted with lower dialkyl nitrogen halides to form tertiary amines having one fatty alkyl group and two lower alkyl groups.

Several general methods for the synthesis of tertiary amines are available in the prior art. Hoffman, for example, reported in 1849 that tertiary amines are produced by successive reactions starting with ammonia and alkyl halides. A primary problem in the production of tertiary amines having a fatty alkyl group, however, is a convenient source of fatty alkyl groups in the form of reactive compounds for use as raw materials. Trialkyl aluminum provides a convenient and reactive source for selected alkyl groups. Applicants, however, are unaware of any prior art process in which trialkyl aluminum is employed as a source of fatty alkyl groups in the production of tertiary amines.

It is, therefore, an object of this invention to provide a novel process for the manufacture of tertiary amines.

It is a further object of this invention to provide a process for the preparation of tertiary amines having one fatty alkyl group supplied from trialkyl aluminum.

It is a still further object of this invention to provide a process for the preparation of tertiary amines having one fatty alkyl group and two lower alkyl groups by the reaction of fatty trialkyl aluminum and N,N-lower dialkyl nitrogen halides.

These objects are achieved by the present invention which is directed to a process for the reaction of trialkyl aluminum whose alkyl groups each contain about 6 to about 18 carbon atoms with N,N-dialkyl nitrogen halides whose alkyl groups each contain from one to about three carbon atoms. The process comprises the initial mixing of the N,N-dialkyl nitrogen halide and the trialkyl aluminum under an inert gas atmosphere with agitation and cooling to form a N,N-dialkyl nitrogen halide-trialkyl aluminum complex, hereinafter referred to as a nitrogen-aluminum complex. The nitrogen-aluminum complex formed is evidenced by sufficient stability so that temperatures of about 150° C. at atmospheric pressure do not distill off volatile components. This is surprising since the N,N-dialkyl nitrogen halides employed in the present invention have boiling points considerably below this temperature. N,N-dimethyl nitrogen chloride, for example, boils at about 43° C. The nitrogen-aluminum complex is next heated for a prolonged period in a closed reactor to react the complexed N,N-dialkyl nitrogen halide and the trialkyl aluminum, and tertiary amine is recovered from the reacted material.

The N,N-dialkyl nitrogen halides useful in the present process are chlorides, bromides or iodides whose alkyl groups each contain from one to about three carbon atoms. Examples of N,N-dialkyl nitrogen halides which can be employed are N,N-dimethyl nitrogen chloride, N,N-diethyl nitrogen chloride, N,N-dipropyl nitrogen chloride, N,N-methylisopropyl nitrogen chloride, N,N-dimethyl nitrogen bromide and N,N-diethyl nitrogen iodide.

The trialkyl aluminum employed include those having alkyl groups, each of which contain about 6 to about 18 carbon atoms. Examples of useful trialkyl aluminums include trihexyl aluminum, tridecyl aluminum, trioctadecyl aluminum, decyl dihexyl aluminum, hexyl decyl octadecyl aluminum and decyl dioctadecyl aluminum.

The initial mixing of the N,N-dialkyl nitrogen halide with the trialkyl aluminum to form a nitrogen-aluminum complex is preferably controlled with care. If the N,N-dialkyl nitrogen halide is added at a rapid rate, without sufficient agitation and cooling, the high heat of solution of N,N-dialkyl nitrogen halides in trialkyl aluminum causes local heating and thermal decomposition. Under these conditions a black, tarry mass results, and the desired tertiary amines are not formed. Local heating and thermal decomposition are preferably prevented by slow addition of the N,N-dialkyl nitrogen halide, at least until the reaction is initiated, together with mechanical agitation and the use of cooling to maintain the temperature of the mixture between about 10° C. (but not so low as to result in loss of agitation due to freezing) and about 70° C. (but not so high as to result in thermal decomposition of the reactants). A temperature of about 30° C. to about 50° C. during addition and mixing is preferred. The mixing to form the nitrogen-aluminum complex is performed under an inert (non-reactive) gas atmosphere because of the reactivity of the trialkyl aluminum. Applicants have used nitrogen, but this choice is not critical and any inert gas, such as argon, krypton and helium can be employed.

If desired, inert solvents for the trialkyl aluminum can be used in the initial mixing step to increase the mobility of the mixture and thereby increase the cooling and agitation efficiency. The useful inert solvents include hexane, heptane, octane and other hydrocarbons liquid under the conditions of the reaction.

After complexing the N,N-dialkyl nitrogen halide with the trialkyl aluminum in the manner hereinbefore described, the nitrogen-aluminum complex is heated to from about 140° C. to about 300° C. for about 4 to about 16 hours to carry out the reaction, higher temperatures requiring shorter times. Longer reaction periods have not resulted in increased tertiary amine yields. Applicants have discovered that, for a fixed reaction time of about 4 hours, the product yield reaches a maximum of about 37%, based on the initial weight of trialkyl aluminum, at a temperature of about 200° C. Higher temperatures are therefore unnecessary, although they may decrease the time necessary to obtain the maximum yield. It is naturally preferable, because of decreased capital investments for smaller equipment, to employ conditions which shorten the reaction time.

Applicants have discovered that heating the nitrogen-aluminum complex will not produce the tertiary amines when less than about a three to one mole ratio of N,N-dialkyl nitrogen halide to fatty trialkyl aluminum is present in the nitrogen-aluminum complex. The useful mole ratios of N,N-dialkyl nitrogen halide to trialkyl aluminum in mixing to form the nitrogen-aluminum complex range from about 3:1 to about 9:1. At mole ratios exceeding 9:1, the reaction of the nitrogen-aluminum complex proceeds, but it becomes difficult to separate the product tertiary amines after the reaction period.

Applicants have further discovered that the process is operable at pressures ranging from about 13 mm. of mercury to autogenetic pressures in a closed reactor. The yield of tertiary amine varies with pressure with the higher yields being obtained at higher pressures.

After the reaction has been conducted for the desired time, the tertiary amine product is recovered by first dissolving and hydrolyzing the reacted complex, cooled to about room temperature or below, in water or a dilute aqueous mineral acid solution. For example, equal volumes of aqueous solutions of hydrochloric acid as well as other mineral acids having a concentration from about 3% to about 30% can be employed, and about a 10% aqueous solution of hydrochloric acid is preferred. The amounts of dilute aqueous mineral acid employed are not critical but sufficient amounts are employed to affect solution and hydrolysis.

The mineral acid solution containing the hydrolyzed reaction product is then neutralized with a strong base. The solid forms of potassium hydroxide and sodium hydroxide are considered particularly effective for this neutralization, although other strong bases and their aqueous solutions can be employed in this neutralization step. After neutralization of the mineral acid solution, two phases develop, a lower aqueous phase and an upper oily phase which contains substantially all of the tertiary amine product.

Following neutralization and separation of the upper oily phase, the product tertiary amine is recovered therefrom by conventional distillation and stripping procedures. Some tertiary amine is also dissolved in the aqueous phase and this can be recovered by extraction with appropriate solvents.

Alternatively, the oily phase containing the tertiary amine together with the tertiary amine in the aqueous phase can be recovered by extraction from the neutralized solution without physically separating the phases. The extraction is carried out with water-immiscible, non-reactive, low-boiling solvents which dissolve the oily components liberated in the neutralization step. Examples of the water-immiscible, non-reactive, low-boiling solvents useful in extracting the tertiary amines of the present invention are petroleum ether, hexane, heptane, octane, isooctane and other liquid hydrocarbons.

Subsequent to extraction the solvent is evaporated from the extract and, as before, the tertiary amine is recovered by distillation.

The tertiary amines produced by the process of this invention can be oxidized in a conventional manner with hydrogen peroxide to produce corresponding amine oxides which are excellently suited for use in detergent compositions such as those disclosed by U.S. 2,999,068, issued September 5, 1961, to Will Pilcher and Stanley L. Eaton.

The following examples will illustrate in detail the manner in which the invention may be practiced. It will be understood, however, that the invention is not confined to the specific limitations set forth in the individual examples but rather to the scope of the appended claims.

*Example I*

100 parts by weight of N,N-dimethyl nitrogen chloride were slowly added to 71 parts by weight of tridecyl aluminum under a nitrogen blanket to form a nitrogen-aluminum complex of the reactants. These proportions by weight were equivalent to about a three to one mole ratio of N,N-dimethyl nitrogen chloride to tridecyl aluminum. During the addition, agitation and cooling were employed to maintain the temperature at 30° C. to prevent local heating and thermal decomposition. After the N,N-dimethyl nitrogen chloride was added, the nitrogen-aluminum complex was heated at autogenetic pressure in the glass liner of a rocking autoclave bomb for four hours at 200° C. Pressures within the autoclave bomb did not exceed 25 p.s.i.g. during the heating period. Subsequent to the four hour heating period at the specified temperature, the autoclave bomb was cooled in an ice bath. After cooling, the contents of the glass liner were dissolved in an equal volume of 10% aqueous solution of hydrochloric acid also at ice bath temperature. The acidified solution was then made strongly basic by adding solid potassium hydroxide, whereupon an upper oily phase and lower aqueous phase formed. The upper oily phase was separated, and the lower aqueous phase was extracted three times with equal volumes of petroleum ether. The petroleum ether extract was dried over solid potassium hydroxide, and the petroleum ether solvent was evaporated off to leave a residue containing a minor amount of the tertiary amine product. This residue was combined with the oily phase and the decyl dimethylamine product was then distilled off at a pot temperature of 130° C. and a head temperature of 110° C. at a pressure of 1 mm. of mercury. A 37% yield of decyl dimethylamine was obtained based on the weight of the tridecyl aluminum starting material.

The substitution of equivalent amounts of N,N-diethyl or N,N-dipropyl nitrogen chloride in the process of Example I gives substantially the same results with the exception that the tertiary amine products formed are decyl diethylamine and decyl dipropyl amine, respectively.

In another run of Example I comparable yields of the respective tertiary amine products were obtained by extracting the strongly basic solution of the process of Example I without first separating the oily upper phase.

The substitution of equivalent amounts of tridodecyl and trioctadecyl alkyl aluminums in the process of Example I results in the formation of dodecyl dimethyl amine and octadecyl dimethyl amine, respectively. Also an equivalent amount of mixed alkyl aluminums in which the alkyl radicals range in chain length from $C_8$ to $C_{14}$ can be used to produce a mixture of tertiary amines having a $C_8$ to $C_{14}$ fatty alkyl group.

Dodecyl dimethyl amine produced by the process of this example can be oxidized by known means with hydrogen peroxide to produce the corresponding amine oxide which is excellently suited for use in detergent operations.

*Example II*

100 parts by weight of N,N-dimethyl nitrogen chloride were slowly added to 24 parts by weight of tridecyl aluminum under a nitrogen blanket to form a nitrogen-aluminum complex. These proportions by weight were equivalent to about a nine to one mole ratio of N,N-dimethyl nitrogen chloride to tridecyl aluminum. During the addition agitation and cooling were employed to maintain the temperature at 45° C. to prevent thermal decomposition. After the N,N-dimethyl nitrogen chloride was added, the resulting nitrogen-aluminum complex was heated at autogenetic pressure in the glass liner of a rocking autoclave bomb for 16 hours at 140° C. Pressures within the autoclave bomb did not exceed 25 p.s.i.g. during the heating period. Subsequent to the 16 hour heating period the autoclave bomb was cooled in an ice bath. After cooling, the contents of the glass liner were dissolved in an equal volume of a 10% solution of hydrochloric acid at ice bath temperature. The acidified solution was then rendered strongly basic by the addition of solid potassium hydroxide, whereupon an upper oily phase and lower aqueous phase formed. The basic solution was then exhaustively extracted with three equal-volume portions of petroleum ether. The petroleum ether extract was dried over solid potassium hydroxide, and the petroleum ether solvent was evaporated from the extract to leave a residue of extracted tertiary amine product. The product decyl dimethylamine was then distilled off the residue at a pot temperature of 130° C. and a head temperature of 110° C. at a pressure of 1 mm. of mercury. A yield of 40% of the decyl dimethylamine product was obtained, based on the trialkyl aluminum starting material.

The substitution of equivalent amounts of the corresponding N,N-dialkyl nitrogen iodides and the N,N-dialkyl nitrogen bromides for the N,N-dialkyl nitrogen chlorides employed in the processes of Examples I and II gives comparable results in the formation of the tertiary amines.

Also the use of equal parts by volume of hexane, heptane, and octane as solvents for the trialkyl aluminum during the addition of the N,N-dialkyl nitrogen halides in the processes of Examples I and II increases the efficiency of cooling and agitation.

Furthermore, in the processes of Examples I and II, the tertiary amine product can be recovered without solvent extraction, but with a small amount of product loss in the lower aqueous phase, by separating the oily upper phase after neutralization, drying the separated phase, and distilling the tertiary amines from the dried phase.

In addition to the preferred embodiments described herein, other arrangements and variations within the spirit of the invention and the scope of the appended claims will occur to those skilled in the art.

We claim:

1. The process of producing tertiary amine comprising the steps of: (1) mixing N,N-dialkyl nitrogen halide of which the alkyl groups each contain from 1 to about 3 carbon atoms with trialkyl aluminum having about 6 to about 18 carbon atoms in each alkyl group to form a nitrogen-aluminum complex, the molar ratio of N,N-dialkyl halide to trialkyl aluminum being from about 3 to 1 to about 9 to 1 and the mixing being conducted under an inert gas atmosphere with agitation and cooling to maintain the temperature between the freezing point and thermal decomposition point of the mixture; (2) heating the nitrogen-aluminum complex so formed in a closed reactor at pressures from about 13 mm. of mercury to about autogenetic pressure for a period of about 4 to about 16 hours at temperatures of about 140° C. to about 300° C. to react the N,N-dialkyl nitrogen halide and the trialkyl aluminum; (3) dissolving the reacted complex in a dilute aqueous mineral acid solution to form an acidic tertiary amine solution; and (4) recovering the tertiary amine.

2. The process of claim 1 wherein the inert gas of step (1) is nitrogen.

3. The process of claim 1 wherein tertiary amine is recovered by neutralizing the acidic tertiary amine solution of step (3) with a strong base and extracting the basic solution with a water immiscible, non-reactive solvent to recover tertiary amine.

4. The process of claim 1 wherein the heating of the nitrogen-aluminum complex in step (2) is carried out at autogenetic pressures in a closed reaction vessel.

5. The process of claim 1 wherein the dilute aqueous mineral acid solution in step (3) is an aqueous solution of hydrochloric acid having a concentration of about 3% to about 30%.

6. The process of claim 1 wherein an inert solvent for the trialkyl aluminum is present in step (1).

7. The process of producing tertiary amine comprising the steps of (1) mixing N,N-dialkyl nitrogen halide of which the alkyl groups each contain from 1 to about 3 carbon atoms with trialkyl aluminum having about 6 to about 18 carbon atoms in each alkyl group to form a nitrogen-aluminum complex, the molar ratio of N,N-dialkyl halide to trialkyl aluminum being from about 3 to 1 to about 9 to 1, and the mixing being conducted under an inert gas atmosphere with agitation and cooling to maintain a temperature between about 30° C. and about 50° C.; (2) heating the nitrogen-aluminum complex so formed at autogenetic pressure in a closed reactor for a period of about 4 to about 16 hours at a temperature of about 140° C. to about 300° C. to react the N,N-dialkyl nitrogen halide and the trialkyl aluminum; (3) dissolving the reacted complex in a dilute aqueous mineral acid solution to form an acidic tertiary amine solution; (4) neutralizing the acidic tertiary amine solution with sodium hydroxide to form an upper oily phase and a lower aqueous phase; and (5) recovering tertiary amine from said upper phase.

8. The process of claim 7 wherein the N,N-dialkyl nitrogen halide of step (1) is N,N-dimethyl nitrogen chloride.

9. The process of claim 7 wherein the N,N-dialkyl nitrogen halide of step (1) is N,N-dialkyl nitrogen bromide.

10. The process of claim 7 wherein the N,N-dialkyl nitrogen halide is N,N-dialkyl nitrogen iodide.

11. The process of claim 7 wherein the acidic tertiary amine solution of step (4) is neutralized with solid potassium hydroxide.

12. The process of producing tertiary amine comprising the steps of: (1) mixing N,N-dimethyl nitrogen chloride with trialkyl aluminum having about 6 to about 18 carbon atoms in each alkyl group to form a nitrogen-aluminum complex, the molar ratio of N,N-dimethyl nitrogen chloride to trialkyl aluminum being about 3 to 1, the mixing being conducted in the presence of an inert solvent for said trialkyl aluminum under a nitrogen gas atmosphere with agitation and cooling to maintain the temperature between about 30° C. and about 50° C.; (2) heating said nitrogen-aluminum complex at autogenetic pressure in a closed reactor for a period of about 4 hours at a temperature of about 200° C. to react the N,N-dimethyl nitrogen chloride and the trialkyl aluminum; (3) dissolving the reacted complex in a dilute aqueous solution of hydrochloric acid having a concentration of about 10% to form an acidic tertiary amine solution; (4) rendering the acidic tertiary amine solution strongly basic by the addition of potassium hydroxide to form an upper oily phase and a lower aqueous phase and (5) recovering tertiary amine from said upper oily phase.

13. The process of claim 12 wherein the tertiary amine is extracted from the basic solution of step (4) with a water-immiscible, non-reactive, low-boiling solvent, the extract is dried, the solvent is evaporated from the extract, and the tertiary amine is distilled from the dried, solvent-free extract.

14. The process of claim 12 wherein the inert solvent for the trialkyl aluminum is petroleum ether.

References Cited by the Examiner

Coleman et al.: Jour. Am. Chem. Soc., vol. 56 (1934), pp. 1381–2.

Gilman: Organic Chemistry, vol. 1, 2nd edition (1943), J. Wiley & Sons, New York, p. 553.

CHARLES B. PARKER, *Primary Examiner.*